(12) United States Patent  
Osburn, III et al.

(10) Patent No.: US 8,898,481 B1  
(45) Date of Patent: *Nov. 25, 2014

(54) AUDITABLE CRYPTOGRAPHIC PROTECTED CLOUD COMPUTING COMMUNICATIONS SYSTEM

(71) Applicant: DJ Inventions, LLC, Houston, TX (US)

(72) Inventors: Douglas C. Osburn, III, Houston, TX (US); Nader M. Rabadi, Houston, TX (US)

(73) Assignee: DJ Inventions, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/197,023

(22) Filed: Mar. 4, 2014

Related U.S. Application Data

(63) Continuation-in-part of application No. 13/590,281, filed on Aug. 21, 2012, now Pat. No. 8,694,770, which is a continuation-in-part of application No. 13/552,396, filed on Jul. 18, 2012, now Pat. No. 8,364,950.

(51) Int. Cl.
| | | |
|---|---|---|
| *G06F 11/30* | (2006.01) | |
| *G06F 12/14* | (2006.01) | |
| *H04L 29/06* | (2006.01) | |

(52) U.S. Cl.
CPC ................................. *H04L 63/0471* (2013.01)
USPC ........................................................ 713/192

(58) Field of Classification Search
USPC ........................................................ 713/176
See application file for complete search history.

(56) References Cited

U.S. PATENT DOCUMENTS

| | | |
|---|---|---|
| 5,638,378 A | 6/1997 | Scop et al. |
| 5,719,771 A | 2/1998 | Buck et al. |
| 5,745,384 A | 4/1998 | Lanzerotti et al. |
| 5,794,009 A | 8/1998 | Coleman et al. |
| 5,812,394 A | 9/1998 | Lewis et al. |
| 6,032,154 A | 2/2000 | Coleman et al. |
| 6,411,987 B1 | 6/2002 | Steger et al. |
| 6,628,992 B2 | 9/2003 | Osburn, III |
| 6,658,349 B2 | 12/2003 | Cline |
| 6,687,573 B2 | 2/2004 | Egolf et al. |
| 6,751,562 B1 | 6/2004 | Blackett et al. |
| 6,950,851 B2 | 9/2005 | Osburn, III |
| 6,961,753 B1 | 11/2005 | Osburn, III |
| 7,073,183 B2 | 7/2006 | Hekizono |
| 7,225,248 B1 | 5/2007 | Osburn, III |
| 7,286,914 B2 | 10/2007 | Cerchione et al. |
| 7,587,481 B1 | 9/2009 | Osburn, III |
| 7,646,298 B1 | 1/2010 | Osburn, III et al. |
| 7,673,337 B1 | 3/2010 | Osburn, III |
| 7,673,338 B1 | 3/2010 | Osburn, III et al. |
| 7,747,710 B1 | 6/2010 | Osburn, III et al. |
| 8,069,242 B2 | 11/2011 | Hadar et al. |
| 8,204,717 B2 | 6/2012 | McLaughlin et al. |
| 2004/0217900 A1 | 11/2004 | Martin et al. |
| 2004/0244265 A1 | 12/2004 | Miyata et al. |
| 2005/0138120 A1 | 6/2005 | Gundersen et al. |

FOREIGN PATENT DOCUMENTS

JP 53098861 8/1978

*Primary Examiner* — Dant Shaifer Harriman
(74) *Attorney, Agent, or Firm* — Buskop Law Group, PC; Wendy Buskop

(57) ABSTRACT

An auditable cryptographic protected cloud computing communication system, wherein the system can include a plurality of industrial devices. Each industrial device can have an individualized messaging protocol enabling each industrial device to receive commands and transmit status and measurement data using the individualized messaging protocol for each industrial device. At least one industrial device is in communication with a computing cloud, wherein the computing cloud is configured to provide at least one service and shared hardware and software resources.

11 Claims, 9 Drawing Sheets

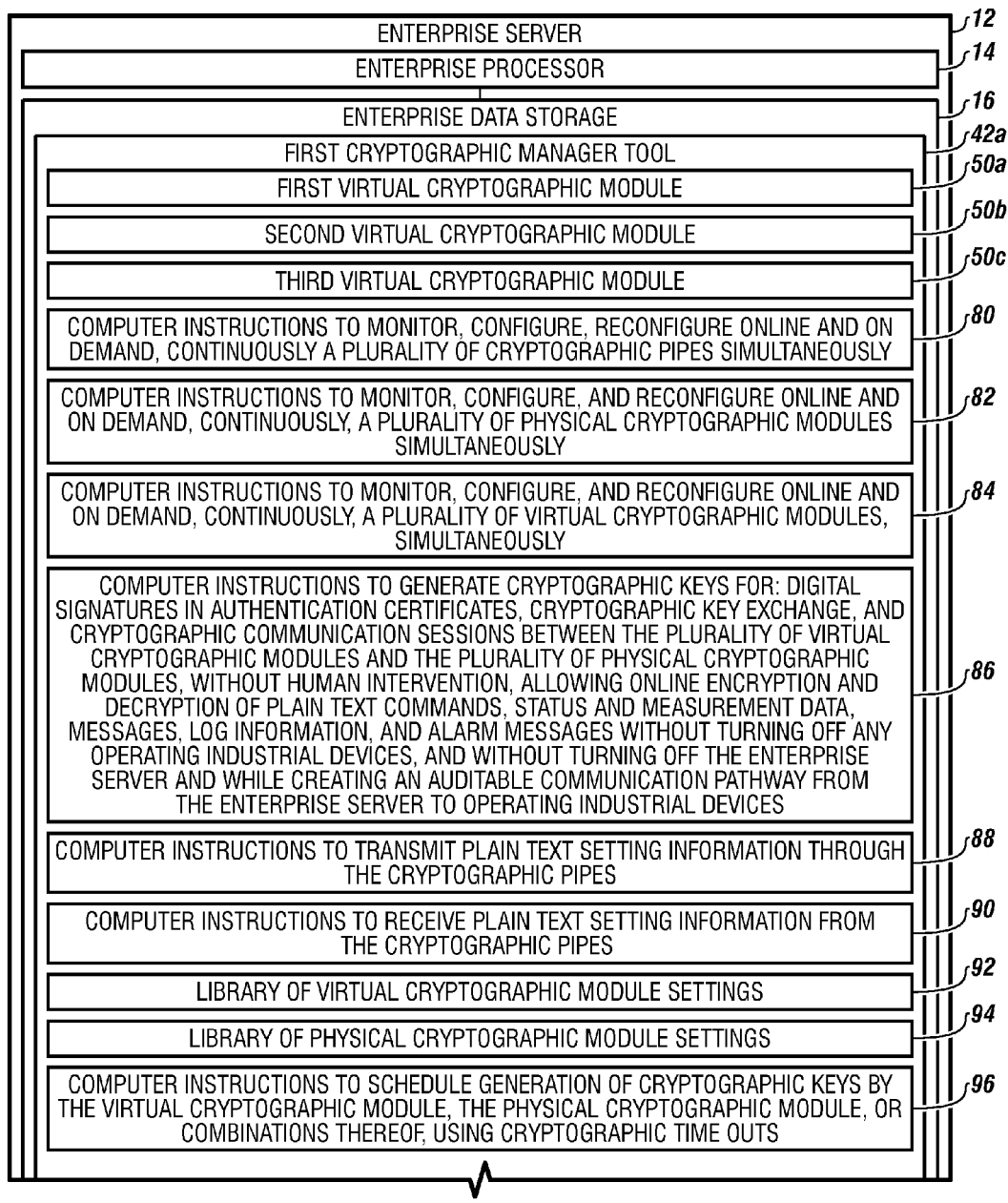

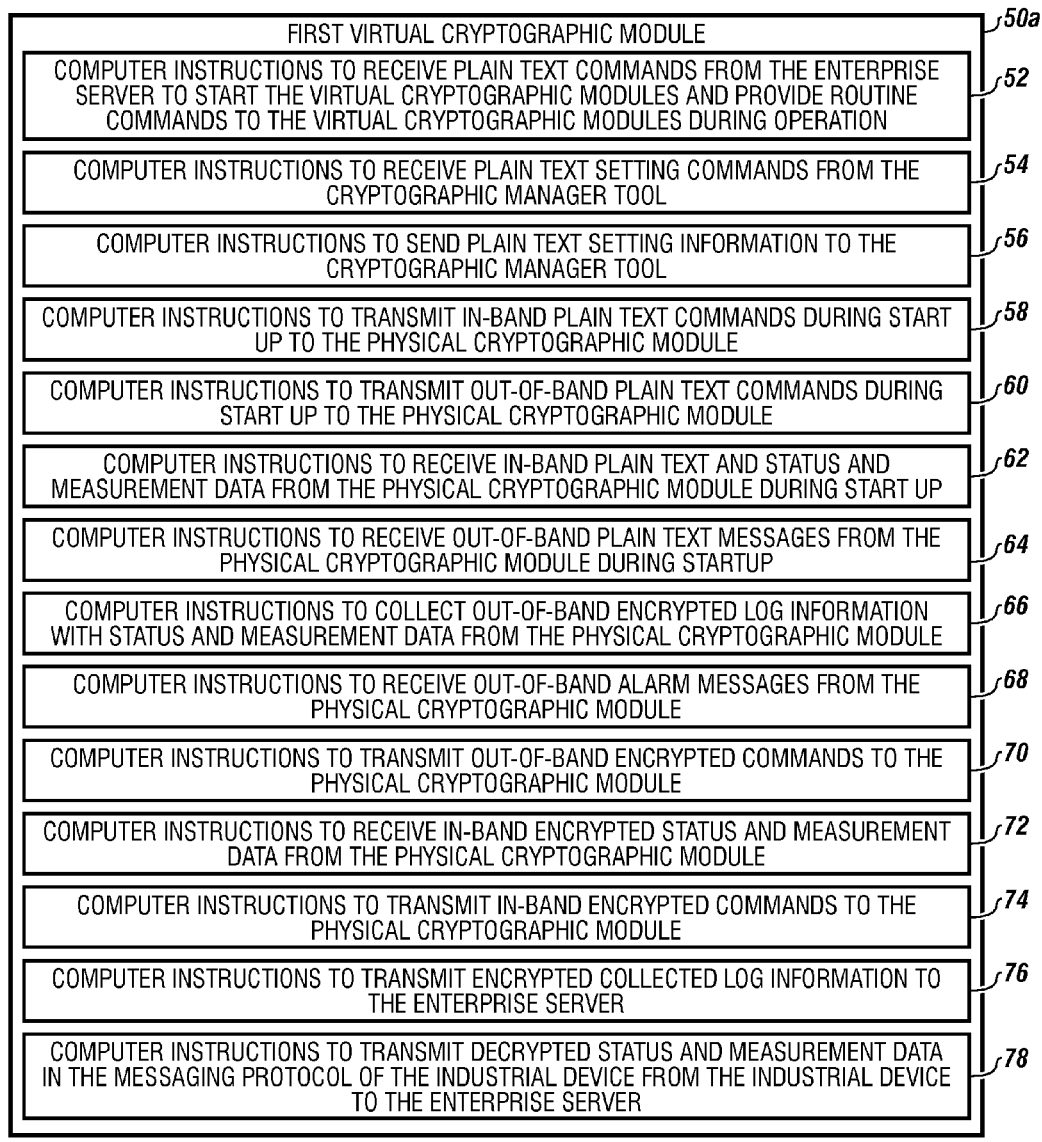

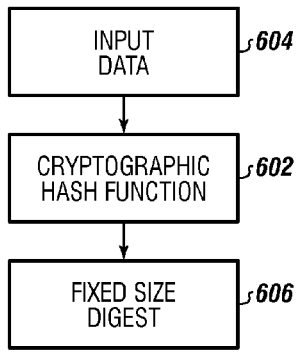
FIGURE 6
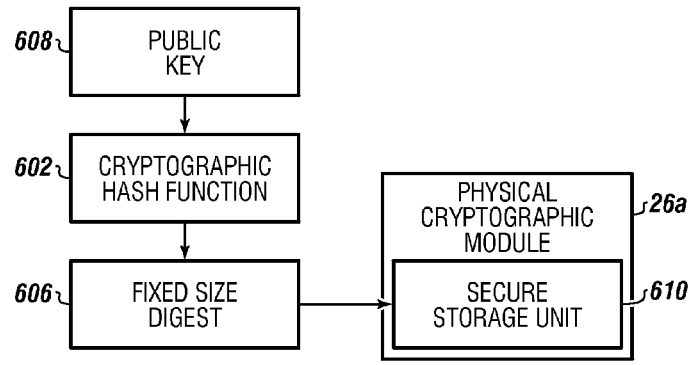
FIGURE 7
FIGURE 8
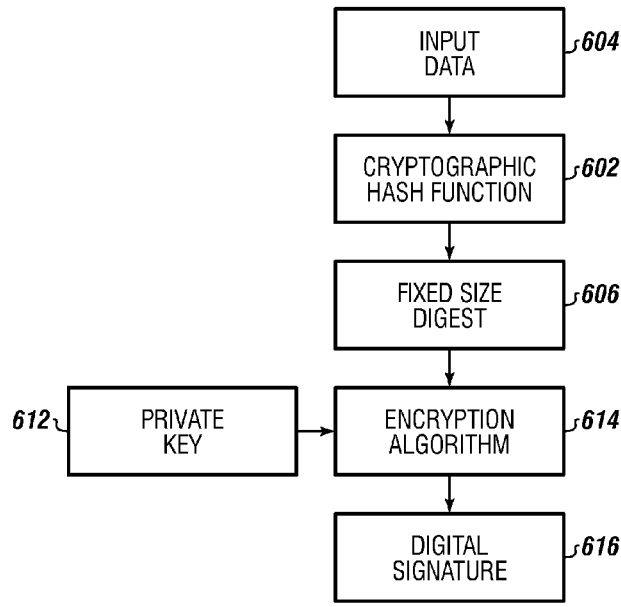

AUDITABLE CRYPTOGRAPHIC PROTECTED CLOUD COMPUTING COMMUNICATIONS SYSTEM

CROSS REFERENCE TO RELATED APPLICATIONS

The present application is a Continuation in Part of co-pending U.S. patent application Ser. No. 13/590,281 filed on Aug. 21, 2012, entitled "AUDITABLE CRYPTOGRAPHIC PROTECTED CLOUD COMPUTING COMMUNICATION SYSTEM," which is a Continuation in Part of U.S. patent application Ser. No. 13/552,396 filed on Jul. 18, 2012, entitled "AUDITABLE CRYPTOGRAPHIC PROTECTED COMMUNICATION SYSTEM," issued as U.S. Pat. No. 8,364,950 on Jan. 29, 2013. These references are incorporated herein in their entirety.

FIELD

The present embodiments generally relates to an auditable cryptographic protected cloud computing communication system.

BACKGROUND

A need exists for a security system that can provide in-band communication to industrial devices from an enterprise server while allowing out-of-band communication between the enterprise server and security devices, which include software termed "cryptographic manager tool," and a hardware/software product termed "physical cryptographic module."

A need exists for a high security communication system usable with a plurality of different networks simultaneously and/or consecutively, between an enterprise server and a plurality of industrial devices.

A need exists for a auditable cryptographic protected cloud computing communication system that is auditable over many networks simultaneously, as the owner of an enterprise server or an industrial device may not control the intervening networks over which the communication may need to occur, which can include a radio/cellular network, the internet, a corporate network, and a local area control network consecutively or simultaneously.

A further need exists for an auditable cryptographic protected cloud computing communication system that provides security between an enterprise server and industrial devices, provides measurement and control data while the enterprise server continuously configures and reconfigures online one or more additional industrial devices, and allows continual monitoring without shutting off industrial devices, a security system, and/or an enterprise server.

The present embodiments meet these needs.

BRIEF DESCRIPTION OF THE DRAWINGS

The detailed description will be better understood in conjunction with the accompanying drawings as follows:

FIGS. 4A and 4B depict a diagram of computer instructions in the data storage of a cryptographic manager tool that can reside in the data storage of an enterprise server connected to a network.

FIG. 5 depicts a diagram of computer instructions in the data storage of a virtual cryptographic module within a cryptographic manager tool according to an embodiment.

FIG. 6 depicts a block diagram that shows operation of the cryptographic hash function.

FIG. 7 is a block diagram that shows the operation of storing a public key.

FIG. 8 is a block diagram that shows the operation of generating a digital signature using the asymmetric cryptography of the present invention.

Figure 1:
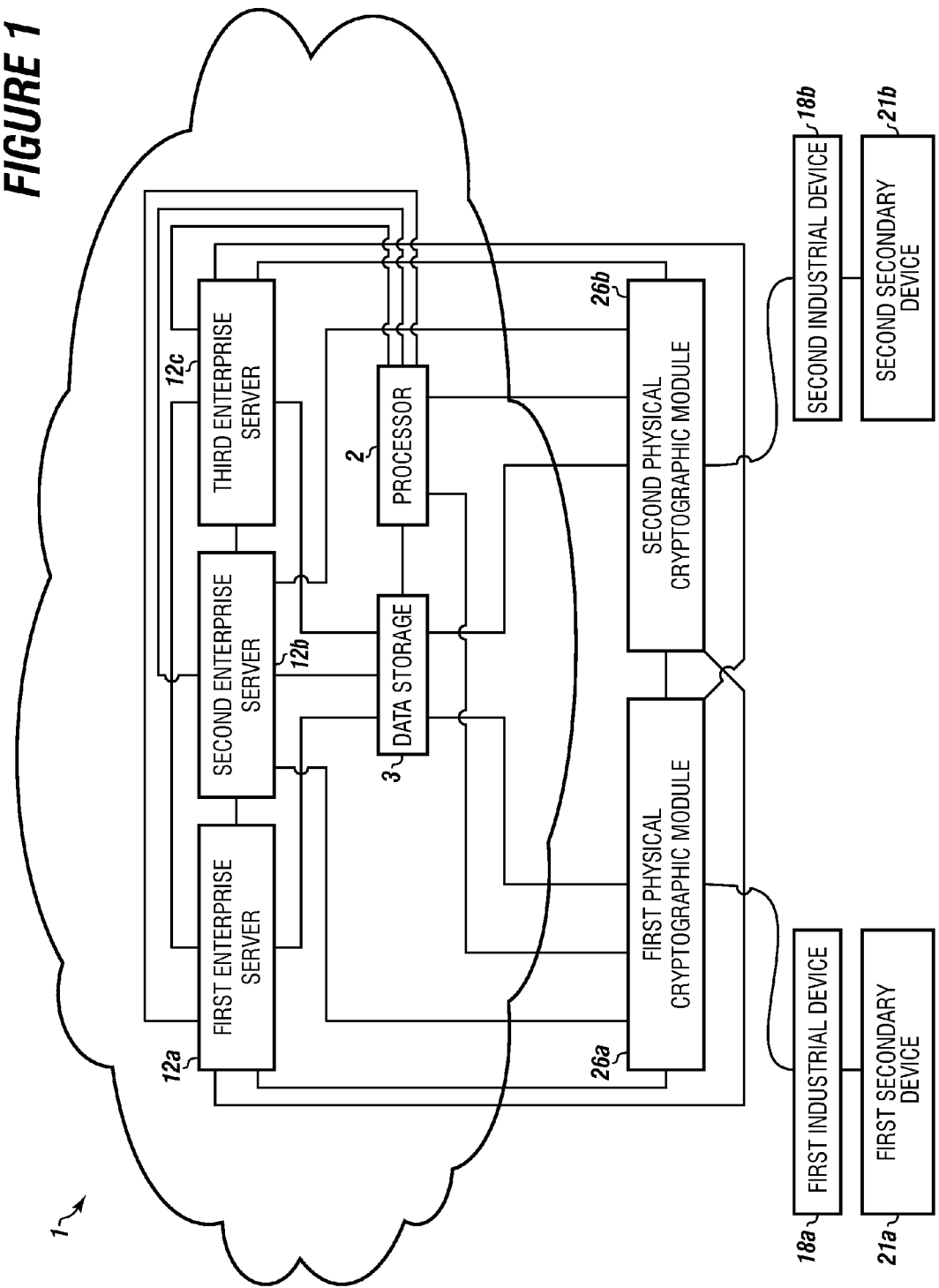
FIG. 1 depicts a schematic of a cloud computing supervisory control and data acquisition system.

The present embodiments are detailed below with reference to the listed Figures.

DETAILED DESCRIPTION OF THE EMBODIMENTS

Before explaining the present system in detail, it is to be understood that the system is not limited to the particular embodiments and that they can be practiced or carried out in various ways.

The present embodiments relate to an auditable cryptographic protected cloud computing communication system.

A benefit of the auditable cryptographic protected cloud computing communication system is that authorized cryptographic module firmware will not run on unauthorized hardware and unauthorized firmware will not run on authorized cryptographic module hardware affectively blocking access to the cloud systems by any unauthorized systems.

Intrusions exposing industrial automation systems that control and meter the production, transmission, and distribution of electricity, natural gas, water, and other utility and industry infrastructures to cyber-attacks continue to increase. Cyber-attacks on these automation systems can result in explosions, fires, catastrophic equipment failures, loss of valuable products, serious personnel injuries possibly resulting in the death, toxic spills damaging the environment, and extended loss of critical services contributing to deleterious public financial and psychological effects.

Concerns over potential attacks has risen to the point that the President of the United States issued "Executive Order 13636—Improving Critical Infrastructure Cyber Security" on Feb. 12, 2014, to encourage voluntary adoption of best practice cyber security measures and standards.

A need exists to secure the largest vulnerability of these critical infrastructures which include the long distance communication between geographically distributed monitoring and control devices and applications such as cloud applications, in control rooms and data centers.

An auditable cryptographic protected cloud computing communication system can include a plurality of industrial devices, wherein each industrial device can have an individualized messaging protocol that can enable each industrial device to receive commands and transmit status and measurement data using the individualized messaging protocol for each industrial device.

The auditable cryptographic protected cloud computing communication system can also include a computing cloud in communication with the plurality of industrial devices, wherein the computing cloud is configured to provide at least one service and shared hardware and software resources.

The computing cloud can include one or more data storage units, one or more processing units, and one or more enterprise servers. The enterprise server can have an enterprise processor.

The enterprise processor can communicate with an enterprise data storage, one or more data storage units in the computing cloud, or combinations thereof. The enterprise server can communicate in each individualized messaging protocol of each industrial device using in-band and out-of-band messages.

The computing cloud can include a plurality of physical cryptographic modules. Each physical cryptographic module can have a physical cryptographic module processor with a physical cryptographic module data storage.

The plurality of physical cryptographic modules can be disposed between the enterprise server in the computing cloud and each industrial device for communicating in-band messages to each industrial device using the messaging protocol of each industrial device.

Each physical cryptographic module data storage can include computer instructions to receive in-band plain text status and measurement data in the individualized messaging protocol of the industrial device in communication therewith.

Each physical cryptographic module data storage can also include computer instructions to transmit in-band decrypted commands to the industrial device, in communication therewith.

Each physical cryptographic module data storage can also include computer instructions for providing encrypted messaging both in-band and out-of-band from the industrial device, in communication therewith, using the individualized messaging protocol of the industrial device.

Each physical cryptographic module data storage can also include computer instructions to generate cryptographic keys for digital signatures in authentication certificates, cryptographic key exchanges, and cryptographic communication sessions between the plurality of physical cryptographic modules, a cryptographic manager tool, one or more data storages in the computing cloud, or combinations thereof without human intervention, allowing online encryption and decryption of plain text commands, status and measurement data, messages, log information, and alarm messages, without turning off any operating industrial devices, and without turning off the enterprise server in the computing cloud and while creating an auditable communication pathway from the enterprise server in the computing cloud to operating industrial devices.

The cryptographic manager tool can include a plurality of virtual cryptographic modules.

Each virtual cryptographic module can include computer instructions to receive plain text commands from the enterprise server to start at least one virtual cryptographic module of the plurality of virtual cryptographic modules and provide routine commands to the at least one virtual cryptographic module during operation.

Each virtual cryptographic module can include computer instructions to receive plain text setting commands from the cryptographic manager tool, computer instructions to transmit plain text setting information to the cryptographic manager tool, computer instructions to transmit in-band plain text commands during start up to the physical cryptographic module, and computer instructions to transmit out-of-band plain text commands during start up to the physical cryptographic module.

Each virtual cryptographic module can include computer instructions to receive in-band plain text and status and measurement data from the physical cryptographic module during start up, computer instructions to receive out-of-band plain text messages from the physical cryptographic module during start up, computer instructions to receive out-of-band encrypted log information with status and measurement data from the physical cryptographic module, computer instructions to receive out-of-band alarm messages from the physical cryptographic module, and computer instructions to transmit out-of-band encrypted commands to the physical cryptographic module.

Each virtual cryptographic module can include computer instructions to receive in-band encrypted status and measurement data from the physical cryptographic module, computer instructions to transmit in-band encrypted commands to the physical cryptographic module, computer instructions to transmit encrypted collected log information to the enterprise server, and computer instructions to transmit decrypted status and measurement data in the messaging protocol of the industrial device to the enterprise server.

Each virtual cryptographic module can include computer instructions to monitor, configure and reconfigure online and on demand, continuously, a plurality of cryptographic pipes connecting the cryptographic manager tool to the physical cryptographic modules. The cryptographic pipes can include computer instructions in one or more data storages in the computing cloud for controlling communication between the cryptographic manager tool and the physical cryptographic modules simultaneously.

Each virtual cryptographic module can include computer instructions to monitor, configure, and reconfigure online and on demand, continuously, the plurality of physical cryptographic modules, simultaneously.

Each virtual cryptographic module can include computer instructions to monitor, configure, and reconfigure online and on demand, continuously, the plurality of virtual cryptographic modules simultaneously.

Each virtual cryptographic module can include computer instructions to generate cryptographic keys for digital signatures in authentication certificates and cryptographic key exchanges.

Each virtual cryptographic module can include computer instructions to create cryptographic communication sessions between the plurality of virtual cryptographic modules and the plurality of physical cryptographic modules, without human intervention, allowing cloud computing based encryption and decryption of plain text commands, status and measurement data, messages, log information, and alarm messages without turning off any operating industrial devices, and without turning off the enterprise server in the computing cloud, and while creating an auditable communication pathway from the enterprise server in the computing cloud to operating industrial devices.

Each virtual cryptographic module can include computer instructions to transmit plain text setting information to at least one cryptographic pipe of the plurality of the cryptographic pipes.

Each virtual cryptographic module can include computer instructions to receive plain text setting information from at least one cryptographic pipe of the plurality of cryptographic pipes.

Each virtual cryptographic module can include a library of virtual cryptographic module settings.

Each virtual cryptographic module can include a library of physical cryptographic module settings.

Each virtual cryptographic module can include computer instructions to schedule generation of cryptographic keys by the virtual cryptographic module, by the physical cryptographic module, or combinations thereof using cryptographic time outs, wherein at least one cryptographic pipe of the plurality of cryptographic pipes communicates with at least one virtual cryptographic module of the plurality of virtual cryptographic modules.

The enterprise server in the computing cloud can include a library of cryptographic module protocols for out-of-band communication with the cryptographic manager tool.

The library of virtual cryptographic module settings can include a pipe local IP address, pipe time outs, a pipe remote IP address, a pipe buffer size, a pipe listen IP address, a local port, a remote port, a pipe protocol, a pipe auto-enable, and combinations thereof.

The library of physical cryptographic module settings can include a tag, a mac address, a lock status, a host port, a device port, closed connection time outs, inter-character time outs, a graphic user ID (GUID), a date created, a date last synched, a number of synchronization, a serial number, a status flag, a status string, a note, and combinations thereof.

The host port can be an RS232 port, an RS485 port, an RS422 port, an Ethernet port, a TCPIP port, or a mesh radio network port.

The device port can be an RS232 port, an RS485 port, an RS422 port, an Ethernet port, a TCPIP port, or a mesh radio network port.

Each cryptographic pipe can include computer instructions that can provide encrypted messaging both in-band and out-of-band from the cryptographic manager tool to the physical cryptographic modules using individualized messaging protocols of each industrial device, and computer instructions that can provide decrypted messaging both in-band and out-of-band, from the physical cryptographic modules to the cryptographic manager tool.

The out-of-band encrypted log information with status and measurement data from the physical cryptographic module can include performance information and information that indicates a breach of security, simultaneously.

The enterprise server in the computing cloud can communicate with the plurality of industrial devices over a plurality of different networks simultaneously, consecutively, or combinations thereof.

The plurality of different networks simultaneously, consecutively, or combinations thereof can include a radio/cellular network, a worldwide network, a corporate network, and a local area control network.

The term "out-of-band for the enterprise server" as used herein can refer to bidirectional messaging from the enterprise server to components of the cryptographic communication system, which can provide security between an enterprise server and industrial devices.

Out-of-band messaging can include commands for implementing diagnostics, testing, performing maintenance, or executing the performance steps required for components of the cryptographic communication system. Out-of-band messaging does not include commands for maintenance and performance of the industrial device to which the cryptographic communication system is connected. Out-of-band messaging can also be used for communicating historical logs that document the performance of security measures, and for messaging information concerning the generation and distribution of cryptographic keys used for validations, key exchanges, and communication sessions by the cryptographic communication system.

The term "in-band" as used herein can refer to bidirectional communication between the enterprise server and one or more connected industrial devices over the cryptographic communication system in the messaging protocol of each industrial device.

The term "out-of-band for the cryptographic manager tool" as used herein can refer to messaging from the cryptographic manager tool to a plurality of physical cryptographic modules of the cryptographic communication system.

The term "cryptographic messaging" can refer to both "in-band" and "out-of-band" messaging that can also include telemetry, which is encrypted between the virtual cryptographic module of the cryptographic manager tool and one or more of the plurality of physical cryptographic modules connected on the network.

The term "cryptographic time outs" as used herein can refer to periods of time, known in the industry as "cryptographic periods," that have been pre-established and stored in the cryptographic manager tool. They can include cryptographic manager tool settings that have been preset by a user based on best practice recommendations from cyber security authorities, such as the US government's National Institute of Standards and Technology (NIST) and corporate security policies, for encrypting information from one or more of a plurality of industrial devices based on the type of industrial device, the type of information being transmitted and/or received, and the level of terrorism or hacking that the industrial device generally experiences.

Turning now to the Figures, FIG. 1 depicts a schematic of a cloud computing supervisory control and data acquisition system.

The computing cloud 1 can include one or more enterprise servers, such as a first enterprise server 12a, a second enterprise server 12b, and a third enterprise server 12c. The enterprise servers 12a-12c can be in communication with one another.

A data storage 3 can also be the computing cloud 1. The data storage 3 can be in communication with a processor 2. The data storage 3 and the processor 2 can also communicate with the enterprise servers 12a-12c.

A first industrial device 18a can communicate with one or more of the enterprise servers 12a-12c via a first physical cryptographic module 26a. A first secondary device 21a can be in communication with the first industrial device 18a. The computing cloud 1 can provide one or more services to the first industrial device 18a or the first secondary device 21a.

A second industrial device 18b can communicate with one or more of the enterprise servers 12a-12c via a second physical cryptographic module 26b. A second secondary device 21b can be in communication with the second industrial device 18b. The computing cloud 1 can provide one or more services to the second industrial device 18b or the second secondary device 21b. The physical cryptographic modules 26a and 26b can act as a gateway to the computing cloud 1.

Figure 2:
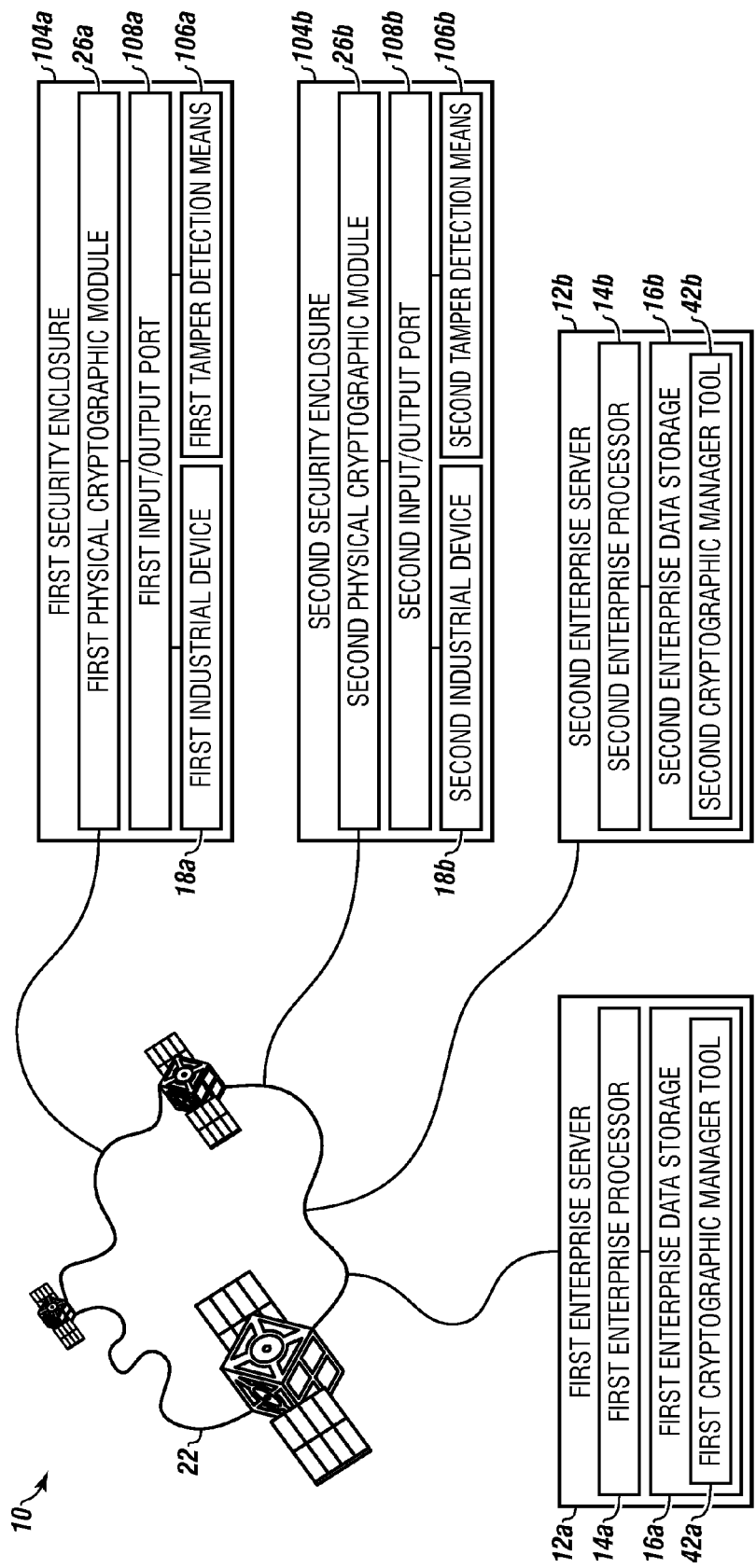
FIG. 2 depicts an overview of a cryptographic communication system.

FIG. 2 depicts an auditable cryptographic protected communication system 10 for connecting to one or more enterprise servers, such as first enterprise server 12a and second enterprise server 12b, and one or more industrial devices, such as first industrial device 18a and second industrial device 18b.

The first enterprise server 12a can each include a first enterprise processor 14a and a first enterprise data storage 16a. The first enterprise server 12a can be a cloud application.

The enterprise servers 12a and 12b can communicate using in-band and out-of-band messages to one or more of a plurality of physical cryptographic modules, such as first physical cryptographic module 26a and second physical cryptographic module 26b. Each physical cryptographic modules 26a and 26b can communicate with one or more of the industrial devices 18a and 18b.

A first cryptographic manager tool 42a can be located in the first enterprise server 12a. A second cryptographic manager tool 42b can be located in a second enterprise server 12b.

The second enterprise server 42b can include a second enterprise processor 14b and a second enterprise data storage 16b.

The enterprise servers 12a and 12b can transmit commands to the industrial devices 18a and 18b in the respective messaging protocols of the industrial devices 18a and 18b through the cryptographic manager tools 42a and 42b.

The industrial devices 18a and 18b can receive commands in unique messaging protocols. The first industrial device 18a can have a first messaging protocol, and the second industrial device 18b can have a second messaging protocol. The industrial devices 18a and 18b can transmit status and measurement data in unique messaging protocols over one or more networks 22. The network 22 can be a combination of dissimilar networks, a combination of similar networks, or combinations thereof. The network 22 can be an uncontrolled network.

The auditable cryptographic protected communication system 10 can include a first security enclosure 104a. The first security enclosure 104a can house the first physical cryptographic module 26a located therein. The first physical cryptographic module 26a can have a first input/output port 108a. The first input/output port 108a can be in communication with the first industrial device 18a and a first tamper detection means 106a.

The auditable cryptographic protected communication system 10 can include a second security enclosure 104b. The second security enclosure 104b can house the second physical cryptographic module 26b located therein. The second physical cryptographic module 26b can have a second input/output port 108b. The second input/output port 108b can be in communication with the second industrial device 18b and a second tamper detection means 106b.

The physical cryptographic modules 26a and 26b can communicate with the first enterprise server 12a, the second enterprise server 12b, or combinations thereof. The physical cryptographic modules 26a and 26b can provide a communication path allowing for the industrial devices 18a and 18b to communicate through in-band and/or out-of-band messages.

The cryptographic manager tools 42a and 42b can each handle up to 2,000 industrial devices simultaneously.

Figure 3:
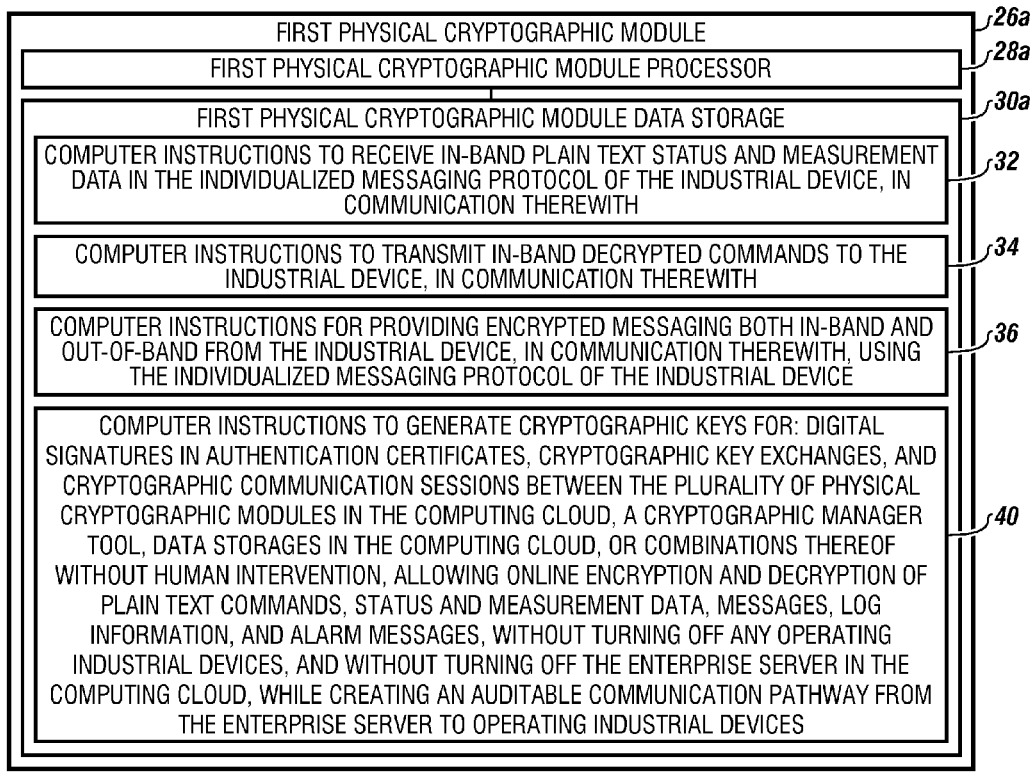
FIG. 3 depicts a diagram of computer instructions in the data storage of physical cryptographic modules usable with a cryptographic manager tool.

FIG. 3 depicts a schematic of the first physical cryptographic module 26a.

The first physical cryptographic module 26a can include a first physical cryptographic module processor 28a and a first physical cryptographic module data storage 30a.

The physical cryptographic module can include at least one of: a non-removable, non-over-writable public key installed in the physical cryptographic module data storage, and a non-removable, non-over-writable digest of a public key installed in the physical cryptographic module data storage.

Each physical cryptographic modules can authenticate individual unique digital signatures resident in each of: a boot loader, an operating system, and an applicational firmware before each boot loader, operating system and applicational firmware is allowed to run by using a hash function to compute a digest of the boot loader, the operating system, and the applicational firmware, and by using the non-removable, non-over-writable public electronic key to decrypt the digital signature resident in the boot loader, the operating system, and the applicational firmware to produce a second digest for comparison to the computed digest of the boot loader, operating system, and applicational firmware, and if there is a match, allowing the boot loader, operating system, and applicational firmware to run.

Each boot loader, operating system, and applicational firmware can further contain an individual certificate containing the public key, and before each boot loader, operating system and applicational firmware is allowed to run, computer instructions in the physical cryptographic module can compute a digest of the public electronic key stored in the individual certificate and compare the computed digest to the stored digest in the physical cryptographic module, and if the comparison matches, then the public electronic key can be used to authenticate the boot loader, operating system and applicational firmware for operation.

Each physical cryptographic modules can include computer instructions to only allow an individual boot loader, and operating System version and an applicational firmware to run on a particular physical cryptographic module.

The first physical cryptographic module data storage 30a can contain computer instructions to receive in-band plain text status and measurement data in the individualized messaging protocol of the industrial device, in communication therewith 32 to which the first physical cryptographic module 26a is connected. For example, an in-band plain text message from the first physical cryptographic module to the industrial device can be a command to send status and measurement data.

The first physical cryptographic module data storage 30a can also contain computer instructions to transmit in-band decrypted commands to the industrial device, in communication therewith 34. An example of an in-band decrypted command to the industrial device which is decrypted by the first physical cryptographic module can be a command that opens a certain valve.

The first physical cryptographic module data storage 30a can contain computer instructions for providing encrypted messaging both in-band and out-of-band from the industrial device, in communication therewith, using the individualized messaging protocol of the industrial device 36.

The first physical cryptographic module data storage 30a can contain computer instructions to generate cryptographic keys computer instructions to generate cryptographic keys for: digital signatures in authentication certificates, cryptographic key exchanges, and cryptographic communication sessions between the plurality of physical cryptographic modules in the computing cloud, a cryptographic manager tool, data storages in the computing cloud, or combinations thereof without human intervention, allowing online encryption and decryption of plain text commands, status and measurement data, messages, log information, and alarm messages, without turning off any operating industrial devices, and without turning off the enterprise server in the computing cloud, while creating an auditable communication pathway from the enterprise server to operating industrial devices 40.

The cryptographic keys can be used to create digital signatures in authentication certificates, cryptographic key exchanges, and cryptographic communication sessions between the plurality of virtual cryptographic modules and the plurality of physical cryptographic modules without human intervention, allowing online encryption and decryption of plain text commands, status and measurement data, messages, log information, and alarm messages without turning off any operating industrial devices, and without turning off the enterprise server, while creating an auditable communication pathway from the enterprise server to operating industrial devices. An example of a cryptographic key can be a public key to decrypt a digital signature on an authentication certificate.

Figure 4B:
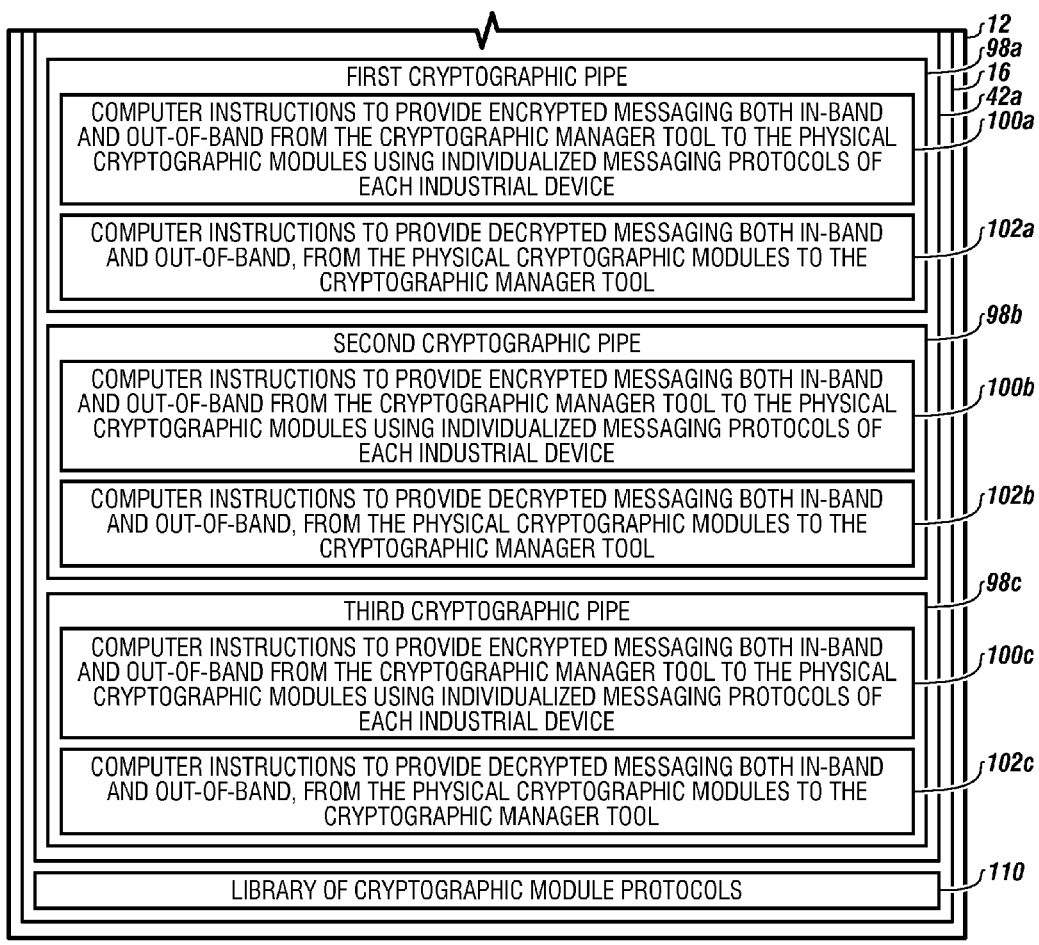

FIG. 4A and FIG. 4B depict a schematic of an enterprise server 12.

The enterprise server 12 can include the enterprise processor 14 and the enterprise data storage 16. The enterprise server 12 can also include the first cryptographic manager tool 42a.

The first cryptographic manager tool 42a can include a plurality of virtual cryptographic modules 50a-50c, such as first virtual cryptographic module 50a, second virtual cryptographic module 50b, and third virtual cryptographic module 50c.

The first cryptographic manager tool 42a can include computer instructions to monitor, configure and reconfigure online and on demand, continuously, a plurality of cryptographic pipes simultaneously 80.

The term "cryptographic pipe" as used herein can refer to a virtual pipe connecting the physical cryptographic module to the enterprise server, and can refer to software programs with unique computer instructions and combinations thereof.

The first cryptographic manager tool 42a can include computer instructions to monitor, configure, and reconfigure online and on demand, continuously, a plurality of physical cryptographic modules simultaneously 82.

The first cryptographic manager tool 42a can include computer instructions to monitor, configure, and reconfigure online and on demand, continuously, a plurality of virtual cryptographic modules simultaneously 84.

The first cryptographic manager tool 42a can include computer instructions to generate cryptographic keys for: digital signatures in authentication certificates, cryptographic key exchanges, and cryptographic communication sessions between a plurality of virtual cryptographic modules and a plurality of physical cryptographic modules, without human intervention, allowing online encryption and decryption of plain text commands, status and measurement data, messages, log information, and alarm messages without turning off any operating industrial devices, and without turning off the enterprise server and while creating an auditable communication pathway from the enterprise server to operating industrial devices 86.

The first cryptographic manager tool 42a can include computer instructions to transmit plain text setting information through the cryptographic pipes 88.

The first cryptographic manager tool can include computer instructions to receive plain text setting information from the cryptographic pipes 90.

The first cryptographic manager tool 42a can include a library of virtual cryptographic module settings 92. The library of virtual cryptographic module settings 92 can include, but is not limited to: a pipe local IP address, a pipe time out, a pipe remote IP address, a pipe buffer size, a pipe listen IP address, a local port, a remote port, a pipe protocol, a pipe auto-enable, and multiples or combinations thereof.

The first cryptographic manager tool 42a can include a library of physical cryptographic module settings 94. The library of physical cryptographic module settings can include, but are not limited to: a tag; a mac address; a lock status, such as a memory lock; a host port; a device port; and combinations of these settings. The host port can be an RS232 port, an RS485 port, an RS422 port, an Ethernet port, a TCPIP port, a mesh radio network, and combinations thereof. The device port can have the same kinds of ports as the host port.

The library of physical cryptographic module settings 94 can also include, but is not limited to: a closed connection time out, inter-character time outs, a graphic user ID (GUID), a date created, a date last synched, a number of synchronization, a serial number, a status flag, a status string, notes, and combinations thereof.

The first cryptographic manager tool 42a can include computer instructions to schedule generation of cryptographic keys by the virtual cryptographic module, the physical cryptographic module, or combinations thereof, using cryptographic time outs 96.

The first cryptographic manager tool 42a can include one or more cryptographic pipes, shown here as first cryptographic pipe 98a, second cryptographic pipe 98b, and third cryptographic pipe 98c. The cryptographic pipes 98a, 98b, and 98c can communicate with one or more of the virtual cryptographic modules 50a, 50b, and 50c.

The first cryptographic pipe 98a can include computer instructions to provide encrypted messaging both in-band and out-of-band from the cryptographic manager tool to the physical cryptographic modules using individualized messaging protocols of each industrial device 100a.

The first cryptographic pipe 98a can also include computer instructions to provide decrypted messaging both in-band and out-of-band, from the physical cryptographic modules to the cryptographic manager tool 102a.

The second cryptographic pipe 98b can include computer instructions to provide encrypted messaging both in-band and out-of-band from the cryptographic manager tool to the physical cryptographic modules using individualized messaging protocols of each industrial device 100b.

The cryptographic pipe 98b can also include computer instructions to provide decrypted messaging both in-band and out-of-band, from the physical cryptographic modules to the cryptographic manager tool 102b.

The third cryptographic pipe 98c can include computer instructions to provide encrypted messaging both in-band and out-of-band from the cryptographic manager tool to the physical cryptographic modules using individualized messaging protocols of each industrial device 100c.

The cryptographic pipe 98c can also include computer instructions to provide decrypted messaging both in-band and out-of-band, from the physical cryptographic modules to the cryptographic manager tool 102c.

The enterprise server 12 can include a library of cryptographic module protocols 110.

FIG. 5 depicts a schematic of a virtual cryptographic module contained within the cryptographic manager tool.

The first virtual cryptographic module 50a can have computer instructions to receive plain text commands from the enterprise server to start the virtual cryptographic modules and provide routine commands to the virtual cryptographic modules during operation 52.

The first virtual cryptographic module 50a can have computer instructions to receive plain text setting commands from the cryptographic manager tool 54.

The first virtual cryptographic module 50a can have computer instructions to send plain text setting information to the cryptographic manager tool 56.

The first virtual cryptographic module 50a can have computer instructions to transmit in-band plain text commands during start up to the physical cryptographic module 58.

The first virtual cryptographic module 50a can have computer instructions to transmit out-of-band plain text commands during start up to the physical cryptographic module 60.

The first virtual cryptographic module 50a can have computer instructions to receive in-band plain text and status and measurement data from the physical cryptographic module during start up 62.

The first virtual cryptographic module 50a can have computer instructions to receive out-of-band plain text messages from the physical cryptographic module during startup 64, which can include performance data.

The first virtual cryptographic module 50a can have computer instructions to collect out-of-band encrypted log information with status and measurement data from the physical cryptographic module 26. In embodiments, the log information can be performance information and information that indicates a breach of security.

The first virtual cryptographic module 50a can have computer instructions to receive out-of-band alarm messages from the physical cryptographic module 68.

The first virtual cryptographic module 50a can have computer instructions to transmit out-of-band encrypted commands to the physical cryptographic module 70.

The first virtual cryptographic module 50a can have computer instructions to receive in-band encrypted status and measurement data from the physical cryptographic module 72.

The first virtual cryptographic module 50a can have computer instructions to transmit in-band encrypted commands to the physical cryptographic module 74.

The first virtual cryptographic module 50a can have computer instructions to transmit encrypted collected log information to the enterprise server 76.

The first virtual cryptographic module 50a can have computer instructions to transmit decrypted status and measurement data in the messaging protocol of the industrial device from the industrial device to the enterprise server 78.

FIG. 6 depicts a block diagram that shows operation of the cryptographic hash function.

The cryptographic hash function 602 can accept an arbitrary data as its input, such as a public key, a boot loader, an operating system or an applicational firmware, shown as input data 604, and can then generate a fixed-size digest 606.

One of the functional operations of a cryptographic hash function can be to generate a digest whose size is smaller than the size of an input data. A small-sized digest representation of the input data can be processed by cryptographic algorithms faster than the large-sized input data.

FIG. 7 is a block diagram that shows the operation of storing a public key in the physical cryptographic module inside the secure storage unit.

A cryptographic hash function 602 can accept the public key 608 as its input and then generate a fixed-size digest 606. The fixed-size digest 606 can then be transferred into the physical cryptographic module 26a inside the secure storage unit 610 of the physical cryptographic module.

FIG. 8 is a block diagram that shows the operation of generating a digital signature using asymmetric cryptography.

Asymmetric cryptography can use a pair of keys that are mathematically related to each other, such as a private key and a public key. Input data 604, such as a boot loader, an operating system or an applicational firmware, can be passed to a cryptographic hash function 602. The cryptographic hash function 602 can generate a fixed-size digest 606.

The fixed-size digest can then be passed to an encryption algorithm 614 that can use the private key 612 to generate a digital signature 616.

Figure 9:
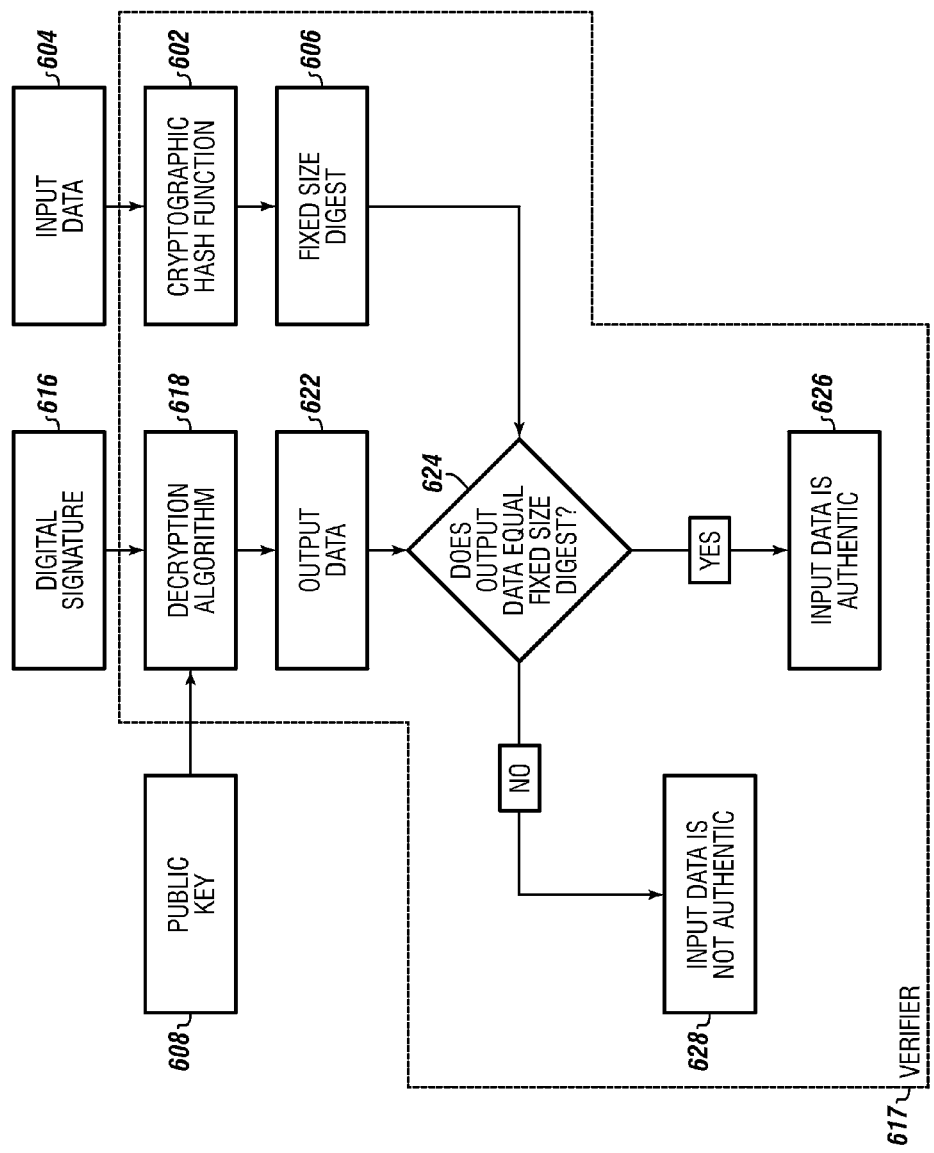
FIG. 9 is a block diagram depicting the operation of verifying a digital signature using the public key according to the invention.

FIG. 9 is a block diagram depicting the operation of verifying a digital signature using the public key that is mathematically related to the private key.

Input data 604 and the digital signature 616 can be provided to the verifier 617. The verifier 617 can pass the digital signature 616 to a decryption algorithm 618.

The decryption algorithm 618 can use the public key 608 to generate an output data 622. The verifier 617 can also pass the input data 604 to the cryptographic hash function 602 to generate a fixed-size digest 606.

The verifier can run a comparison 624 of the output data 622 from the decryption algorithm 618 to the generated fixed-size digest 606.

If the comparison matches, that is, if the output data equals the fixed-sized digest, then the input data 604 is accepted by the verifier 617 as authentic 626. If the comparison fails, then the input data 604 is rejected by the verifier 617 as not authentic 628.

Figure 10:
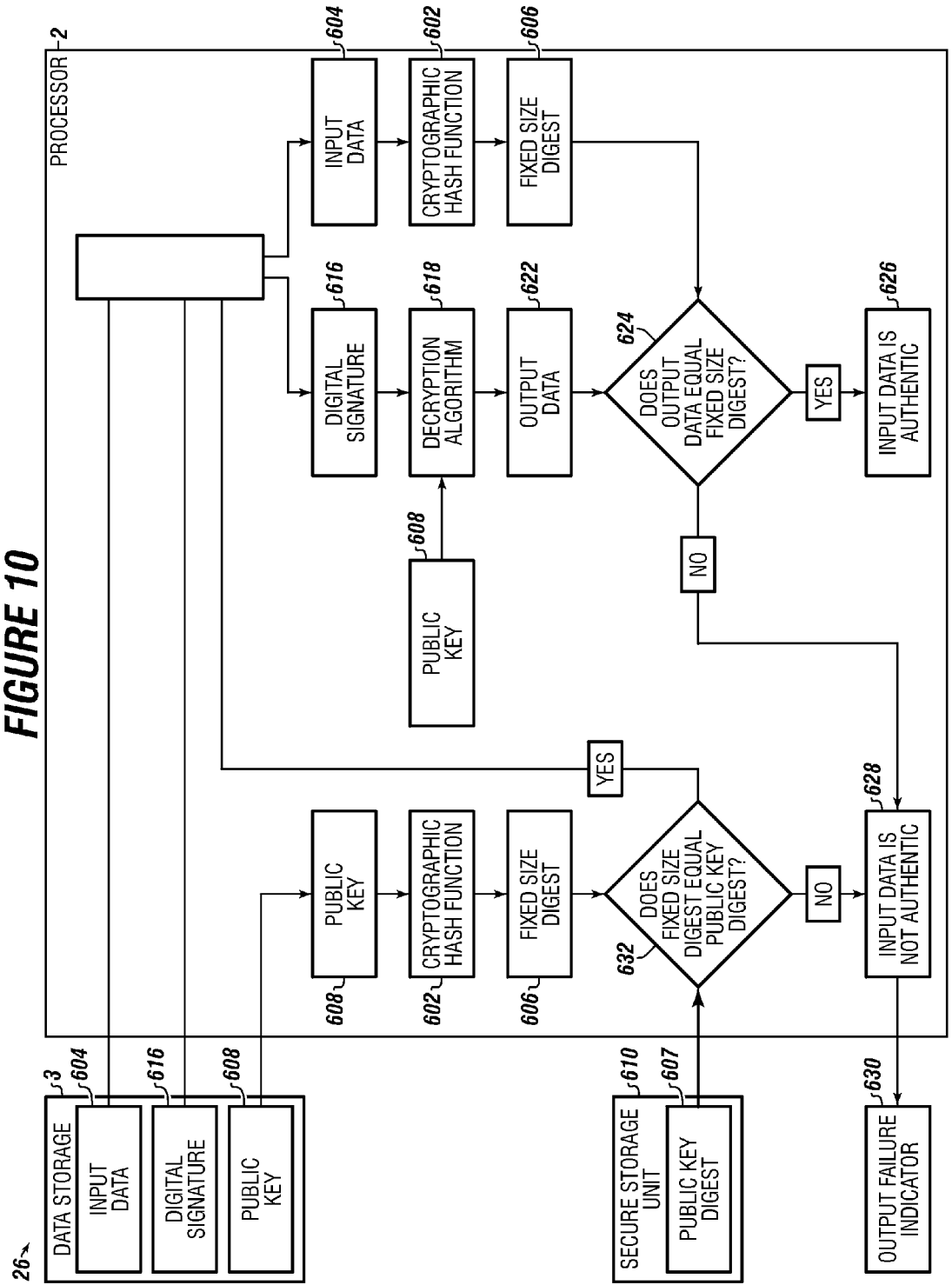
FIG. 10 is a block diagram that shows the operation performed by the physical cryptographic module to authenticate an input data, an operating system or an applicational firmware according to the invention.

FIG. 10 is a block diagram that shows the operation performed by the physical cryptographic module to authenticate input data.

The input data 604, digital signature 616 and public key 608 can reside in the data storage 3 of the physical cryptographic module 26. The public key can be a certificate file that resides in the data storage of the physical cryptographic module.

The processor 2 of the physical cryptographic module can retrieve the public key 608 from the data storage 3 and use a cryptographic hash function 602 to generate a fixed-size digest 606.

The processor 2 can then compare 632 the generated fixed-size digest 606 with a stored public key digest 607 in the secure storage unit 610 of the physical cryptographic module.

If the comparison fails and the two digests do not match, then the processor rejects the input data as not authentic 628, does not run the input data, and provides an output failure indicator 630 to the user.

If the comparison matches, the processor then retrieves the input data 604 and the digital signature 616 from the data storage 3 for processing signature verification.

The processor can pass the digital signature 616 to a decryption algorithm 618. The decryption algorithm 618 can use the public key 608 to generate an output data 622.

The processor can also pass the input data 604 to the cryptographic hash function 602 to generate a fixed-size digest 606. The processor can then compare 624 the output data 622 from the decryption algorithm 618 to the generated fixed-size digest 606.

If the comparison fails, then the processor 2 rejects the input data as not authentic 628 and provides an output failure indicator 630 to the user. If the comparison matches, then the input data is verified as authentic 626 and the processor runs the input data.

While these embodiments have been described with emphasis on the embodiments, it should be understood that within the scope of the appended claims, the embodiments might be practiced other than as specifically described herein.

What is claimed is:

1. An auditable cryptographic protected cloud computing communication system comprising:
 a. a plurality of industrial devices, wherein each industrial device has an individualized messaging protocol enabling each industrial device to receive commands and transmit status and measurement data using the individualized messaging protocol for each industrial device;
b. a computing cloud in communication with the plurality of industrial devices, wherein the computing cloud provides at least one data storage service, shared hardware resources, and shared software applications to each of the plurality of industrial devices, and wherein the shared hardware resources comprise:
   (i) one or more data storages;
   (ii) one or more processors; and
   (iii) one or more enterprise servers having an enterprise processor, wherein the enterprise processor is in communication with an enterprise data storage, one or more data storages in the computing cloud, or combinations thereof, wherein the enterprise server communicates in each individualized messaging protocol of each industrial device using in-band and out-of-band messages; and
c. a plurality of physical cryptographic modules, each physical cryptographic module comprising:
   (i) a physical cryptographic module processor;
   (ii) a physical cryptographic module data storage; and
   (iii) at least one of: a non-removable, non-over-writable public key installed in the physical cryptographic module data storage, and a non-removable, non-over-writable digest of a public key installed in the physical cryptographic module data storage;
   wherein the plurality of physical cryptographic modules are disposed between the enterprise server in the computing cloud and each industrial device for communicating in-band messages to each industrial device using the messaging protocol of each industrial device; and
   further wherein each physical cryptographic module will, for each industrial device:
      1. authenticate individual unique digital signatures resident in each of: a boot loader, an operating system, and an applicational firmware, wherein the boot loader, the operating system, and the applicational firmware are resident in one or more data storages in the computing cloud;
      2. compute a digest for each of the boot loader, the operating system, and the applicational firmware by using a hash function, thereby creating a computed digest;
      3. decrypt the digital signature resident in each of the boot loader, the operating system, and the applicational firmware to produce a second digest by using the non-removable, non-over-writable public electronic key for each of the boot loader, the operating system, and the applicational firmware respectively;
      4. compare each second digest of the boot loader, the operating system and the applicational firmware to each computed digest of the boot loader, the operating system and the applicational firmware respectively;
      5. allow the boot loader to run on one of the processors in the computing cloud if the computed digest for the boot loader and the second digest for the boot loader match;
      6. allow the operating system to run on one of the processors in the computing cloud if the computed digest for the operating system and the second digest for the operating system match;
      7. allow the applicational firmware to run on one of the processors in the computing cloud if the computed digest for the applicational firmware and the second digest for the applicational firmware match; and
      8. terminate cloud computing processes associated with the boot loader, the operating system and the applicational firmware respectively when any computed digest does not match the second digest for the boot loader, the operating system and the applicational firmware respectively;
   (iv) wherein each physical cryptographic module comprises:
      1. computer instructions to receive in-band plain text status and measurement data in the individualized messaging protocol of the industrial device in communication therewith;
      2. computer instructions to transmit in-band decrypted commands to the industrial device, in communication therewith;
      3. computer instructions for providing encrypted messaging both in-band and out-of-band from the industrial device, in communication therewith, using the individualized messaging protocol of the industrial device; and
      4. computer instructions to generate cryptographic keys; and
d. a plurality of virtual cryptographic modules resident in one of the processors of the computing cloud, each virtual cryptographic module comprising:
   (i) computer instructions for receiving bidirectional out-of-band plain text commands during start up to the physical cryptographic module;
   (ii) computer instructions for sending bidirectional in-band plain text and status and measurement data during start up from the physical cryptographic module;
   (iii) computer instructions for receiving bidirectional out-of-band encrypted commands to the physical cryptographic module;
   (iv) computer instructions for sending bidirectional in-band encrypted status and measurement data from the physical cryptographic module;
   (v) computer instructions to transmit encrypted collected log information to the enterprise server;
   (vi) computer instructions to transmit decrypted status and measurement data in the messaging protocol of the industrial device from the industrial device to the enterprise server;
   (vii) computer instructions to monitor, configure, reconfigure online and on demand, continuously, the plurality of physical cryptographic modules, simultaneously;
   (viii) computer instructions to monitor, configure, reconfigure online and on demand, continuously, at least one of the plurality of virtual cryptographic modules, simultaneously;
   (ix) computer instructions to generate cryptographic keys for: digital signatures in authentication certificates and cryptographic key exchanges;
   (x) computer instructions to create cryptographic communication sessions between the plurality of virtual cryptographic modules and the plurality of physical cryptographic modules, without human intervention, allowing cloud computing based encryption and decryption of plain text commands, status and measurement data, messages, log information, and alarm messages without turning off any operating industrial devices, and without turning off the enterprise server in the computing cloud, and while creating an auditable communication pathway from the enterprise server in the computing cloud to operating industrial devices;
- (xi) computer instructions for bidirectional plain text setting information to at least one cryptographic pipe of the plurality of the cryptographic pipes;
- (xii) a library of virtual and physical cryptographic module settings; and
- (xiii) computer instructions to schedule generation of cryptographic keys by the virtual cryptographic module, by the physical cryptographic module, or combinations thereof, using cryptographic time outs; and wherein at least one cryptographic pipe of the plurality of cryptographic pipes communicates with at least one virtual cryptographic module of the plurality of virtual cryptographic modules.

2. The auditable cryptographic protected cloud computing communication system of claim 1, wherein each physical cryptographic modules comprises computer instructions to only allow an individual boot loader, and operating System version and an applicational firmware to run on a particular physical cryptographic module.

3. The auditable cryptographic protected cloud computing communication system of claim 1, wherein the enterprise server in the computing cloud comprises a library of cryptographic module protocols for out-of-band communication with the cryptographic manager tool.

4. The auditable cryptographic protected cloud computing communication system of claim 1, wherein the library of virtual cryptographic module settings includes a member of the group consisting of: a pipe local IP address, pipe time outs, a pipe remote IP address, a pipe buffer size, a pipe listen IP address, a local port, a remote port, a pipe protocol, a pipe auto-enable, and combinations thereof.

5. The auditable cryptographic protected cloud computing communication system of claim 1, wherein the library of physical cryptographic module settings includes a member of the group consisting of: a tag, a mac address, a lock status, a host port, a device port, closed connection time outs, inter-character time outs, a graphic user ID (GUID), a date created, a date last synched, a number of synchronization, a serial number, a status flag, a status string, a note, and combinations thereof.

6. The auditable cryptographic protected cloud computing communication system of claim 5, wherein the host port is an RS232 port, an RS485 port, an RS422 port, an Ethernet port, a TCPIP port, or a mesh radio network port.

7. The auditable cryptographic protected cloud computing communication system of claim 5, wherein the device port is an RS232 port, an RS485 port, an RS422 port, an Ethernet port, a TCPIP port, or a mesh radio network port.

8. The auditable cryptographic protected communication system of claim 1,
wherein each cryptographic pipe comprises:
- a. computer instructions to provide encrypted messaging both in-band and out-of-band from the cryptographic manager tool to the physical cryptographic modules using individualized messaging protocols of each industrial device; and
- b. computer instructions to provide decrypted messaging both in-band and out-of-band, from the physical cryptographic modules to the cryptographic manager tool.

9. The auditable cryptographic protected cloud computing communication system of claim 1, wherein the out-of-band encrypted log information with status and measurement data from the physical cryptographic module comprises performance information and information that indicates a breach of security simultaneously.

10. The auditable cryptographic protected cloud computing communication system of claim 1, wherein the enterprise server in the computing cloud communicates with the plurality of industrial devices over a plurality of different networks simultaneously, consecutively, or combinations thereof.

11. The auditable cryptographic protected cloud computing communication system of claim 10, wherein the plurality of different networks simultaneously, consecutively or combinations thereof comprise: a radio/cellular network, a worldwide network, a corporate network, and a local area control network.

* * * * *